No. 630,423. Patented Aug. 8, 1899.
H. STOLZE, Jr.
CANDLE HOLDER FOR CHRISTMAS TREES.
(Application filed Mar. 17, 1899.)
(No Model.)
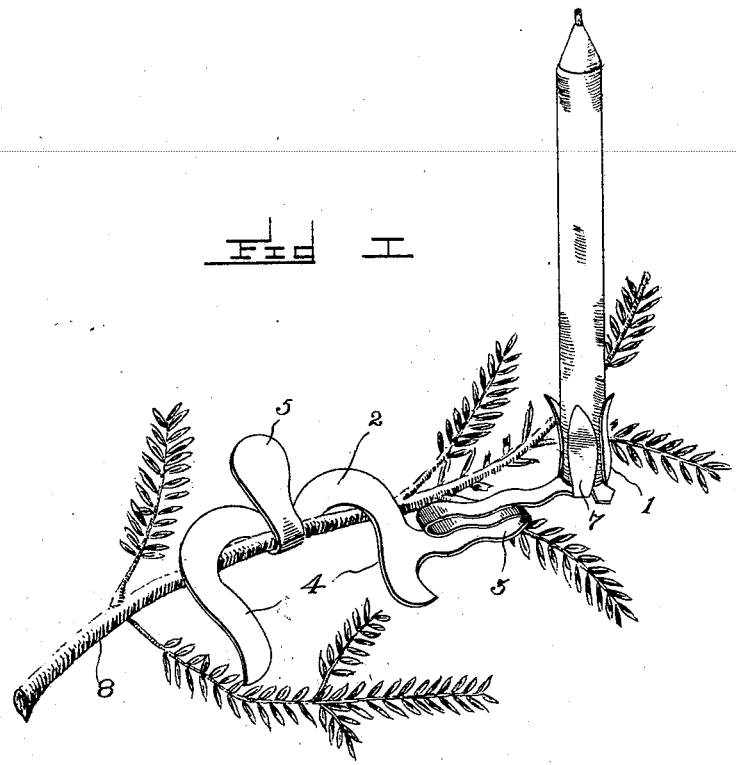
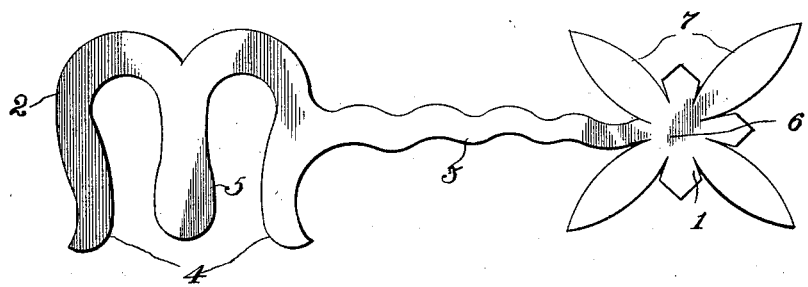
Witnesses
John Maupin
Henry Stolze Jr. Inventor
By his Attorneys,

UNITED STATES PATENT OFFICE.

HENRY STOLZE, JR., OF MANITOWOC, WISCONSIN.

CANDLE-HOLDER FOR CHRISTMAS TREES.

SPECIFICATION forming part of Letters Patent No. 630,423, dated August 8, 1899.

Application filed March 17, 1899. Serial No. 709,524. (No model.)

*To all whom it may concern:*

Be it known that I, HENRY STOLZE, Jr., a citizen of the United States, residing at Manitowoc, in the county of Manitowoc and State of Wisconsin, have invented a new and useful Candle-Holder for Christmas Trees, of which the following is a specification.

This invention relates to candle-holders for use upon Christmas trees, and has for its object to provide a holder which can be readily attached to a limb or small branch of the tree and having means whereby the holder is positively supported in an upright position and is prevented from being tipped or displaced by shaking or any disturbance of the tree.

A further object is to provide an extensible device whereby one part may be attached to the strong portion of the branch and the candle held beyond the point of attachment at or near the tip end of the branch, producing the desired effect and yet insuring security of attachment.

To these ends the present invention consists in the combination and arrangement of parts, as will be hereinafter more fully described, shown in the accompanying drawings, and particularly pointed out in the appended claims.

In the drawings, Figure 1 is a perspective view of the device applied to a branch of a tree. Fig. 2 is a plan view of the device in its blank form before being folded as in Fig. 1.

Corresponding parts are designated by like reference characters in both figures of the drawings.

Referring to the accompanying drawings, and more particularly to Fig. 2 thereof, the device comprises a candle-socket 1, an attaching-clamp 2, and an arm 3, connecting the socket and the clamp, and all formed integral from a single blank of pliable sheet metal. The attaching-clamp comprises a substantially E-shaped body having the side members 4 and the tongue 5 intermediate the members and extending in the same direction therewith. Projecting longitudinally of the clamp and from one of the side members thereof, intermediate of its ends, is the connecting-arm 3, of suitable length and capable of being bent upon itself, as shown in Fig. 1 of the drawings. At the free extremity of this arm is the candle-holding socket 2, comprising a flat base 6 and the radial fingers 7, which are adapted to be bent or folded upward and form the spring-socket shown in Fig. 1.

In applying the device to a tree the clamp is engaged sidewise upon a branch 8, the tongue 5 engaging beneath the branch and the side members 4 over the top of the branch, and then the tongue 5 is bent back over the top of the branch. By reason of the tongue 5 clamping the branch tightly and the side members 4 bearing transversely across the top of the branch at opposite sides of the tongue the device is firmly attached to the branch and is prevented from being accidentally turned thereon or displaced therefrom by reason of the tree being shaken.

As illustrated in Fig. 1, the connecting-arm 3 may be folded or bent upon itself to bring the socket near the clamp, and the arm is also capable of being straightened out, as in Fig. 2, whereby the arm is adjustable longitudinally for the purpose of attaching the clamp to the strong or stiff portion of a branch and locating the candle-holding socket at or near the tip end of the branch, where the candle is desired to be positioned.

It will be understood that the combined weight of a holder and a candle which may be attached at or near the free end of a branch will bend or sag the latter to such a degree that the candle will not be held upright and the candle-grease will fall therefrom.

In view of the foregoing difficulty the connecting-arm 3 has been made pliable, so that the same may be bent, and thereby locate the socket 6 in a horizontal position, whereby the candle may be maintained in an upright position, and thereby prevent dropping of the candle-grease.

The present device provides an exceedingly-useful candle-holder, as it is light and durable. It can be readily and effectively attached to a tree and may be adjusted in length to locate the candle at any desired point. It will be further noted that the device may be folded out flat, as shown in Fig. 2, to facilitate the packing away of a plurality of holders and preserving them for renewed use from time to time as required.

The particular design of the clamp, the socket, and the connecting-arm may be varied and other changes within the scope of the appended claims may be resorted to without departing from the spirit or sacrificing any of the advantages of this invention.

Having thus described the invention, what is claimed is—

1. A candle-holder, comprising an attaching-clamp, a candle-holding socket, and a pliable connection between the clamp and the socket, said connection being folded back longitudinally upon itself, whereby the connection is made extensible and contractible, substantially as shown and described.

2. A candle-holder, comprising a candle-holding socket, an attaching-clamp, and a connection between the socket and the clamp, the latter comprising side members which are adapted to engage transversely across one side of the branch of a tree, and a tongue adapted to engage across the opposite side of the branch and be bent back upon the same, substantially as shown and described.

3. A candle-holder, comprising a candle-holding socket, an attaching-clamp, and a connection between the socket and the clamp, the latter being of substantially E shape, the opposite side members thereof extending transversely of the connection between the clamp and the socket, and the tongue which is intermediate of the side members, capable of being bent upon itself, substantially as shown and described.

4. A candle-holder formed from a single blank of pliable sheet metal, and comprising a candle-holding socket having a base and fingers which are adapted to be bent up and from the socket, an attaching-clamp of substantially E shape, having the side members extending transversely of the socket, and the intermediate pliable tongue which is adapted to be bent upon itself; and a pliable connecting-arm between the clamp and the socket, and capable of being bent or folded upon itself, substantially as shown and described.

In testimony that I claim the foregoing as my own I have hereto affixed my signature in the presence of two witnesses.

HENRY STOLZE, Jr.

Witnesses:
EDWARD LARSON,
JAN KERN.